United States Patent
Ijtsma et al.

(10) Patent No.: US 7,730,348 B2
(45) Date of Patent: Jun. 1, 2010

(54) DEVICE AND METHOD FOR RECORDING INFORMATION

(75) Inventors: Pope Ijtsma, Eindhoven (NL); Johannis Friso Rendert Blacquiere, Eindhoven (NL); Dirk Hamelinck, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 925 days.

(21) Appl. No.: 10/564,910

(22) PCT Filed: Jul. 14, 2004

(86) PCT No.: PCT/IB2004/051214

§ 371 (c)(1),
(2), (4) Date: Jan. 17, 2006

(87) PCT Pub. No.: WO2005/008655

PCT Pub. Date: Jan. 27, 2005

(65) Prior Publication Data

US 2006/0230330 A1    Oct. 12, 2006

(30) Foreign Application Priority Data

Jul. 17, 2003  (EP) ................................ 03102206
Feb. 26, 2004  (EP) ................................ 04100764

(51) Int. Cl.
G06F 11/00  (2006.01)
(52) U.S. Cl. .............................. 714/8; 714/710; 714/723
(58) Field of Classification Search ...................... 714/8
See application file for complete search history.

(56) References Cited

U.S. PATENT DOCUMENTS

| 4,498,146 | A | * | 2/1985 | Martinez ..................... 711/115 |
| 4,746,998 | A | * | 5/1988 | Robinson et al. ........... 360/72.1 |
| 5,075,804 | A | * | 12/1991 | Deyring ....................... 360/49 |
| 5,526,335 | A | | 6/1996 | Tamegai |
| 5,541,903 | A | | 7/1996 | Funahashi et al. |

(Continued)

FOREIGN PATENT DOCUMENTS

EP    0464811 A2    1/1992

(Continued)

OTHER PUBLICATIONS

ISR, the Written Opinion of the International Searching Authority.
ISR Publication, International Publication No. WO 2005/008655A3.

*Primary Examiner*—Scott T Baderman
*Assistant Examiner*—Kamini Patel

(57) ABSTRACT

A device records information in blocks having logical addresses at a physical address in a track on a record carrier. The logical addresses are translated into the physical addresses in dependence of defect management information, which includes defect entries indicating locations for replacing defective physical addresses. A read-only state of the record carrier is obtainable via a no-replacement state indicated by substantially none of the defect entries being free for use. The device has a read-only unit for setting the record carrier to the read-only state by reading original replacement information indicating a writable state, storing the original replacement information in a hidden area, and writing defect management information that is modified to the no-replacement state. The record carrier may be re-opened by retrieving the original replacement information from the hidden area.

14 Claims, 4 Drawing Sheets

U.S. PATENT DOCUMENTS

Figure 3A:
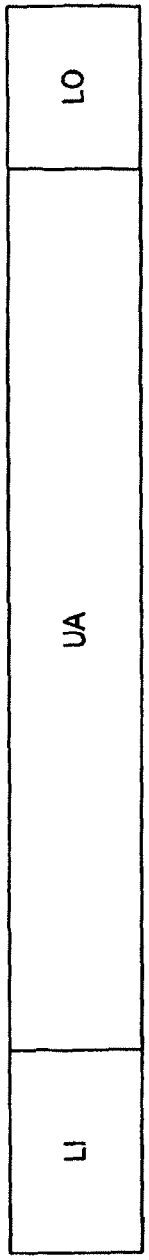

| | | | |
|---|---|---|---|
| 5,848,438 A | 12/1998 | Nemaxie et al. | |
| 5,956,309 A | 9/1999 | Yamamuro | |
| 6,249,884 B1 | 6/2001 | Joo | |
| 6,480,463 B2 * | 11/2002 | Hunter et al. | 720/719 |
| 6,530,037 B2 * | 3/2003 | Ando et al. | 714/8 |
| 6,628,583 B1 * | 9/2003 | Van Den Enden et al. | 369/47.1 |
| 6,868,511 B2 * | 3/2005 | Ko | 714/710 |
| 7,065,671 B2 * | 6/2006 | Nishimura | 714/8 |
| 2002/0108072 A1 | 8/2002 | Beng Sim et al. | |
| 2004/0042363 A1 * | 3/2004 | Kobayashi et al. | 369/53.21 |

FOREIGN PATENT DOCUMENTS

| | | |
|---|---|---|
| EP | 0464811 B1 | 8/1992 |
| EP | 0965988 A2 | 12/1999 |
| EP | 0965988 B1 | 12/1999 |
| EP | 0971349 A2 | 1/2000 |
| JP | 10092149 A | 4/1998 |
| WO | 0122416 A1 | 3/2001 |

* cited by examiner

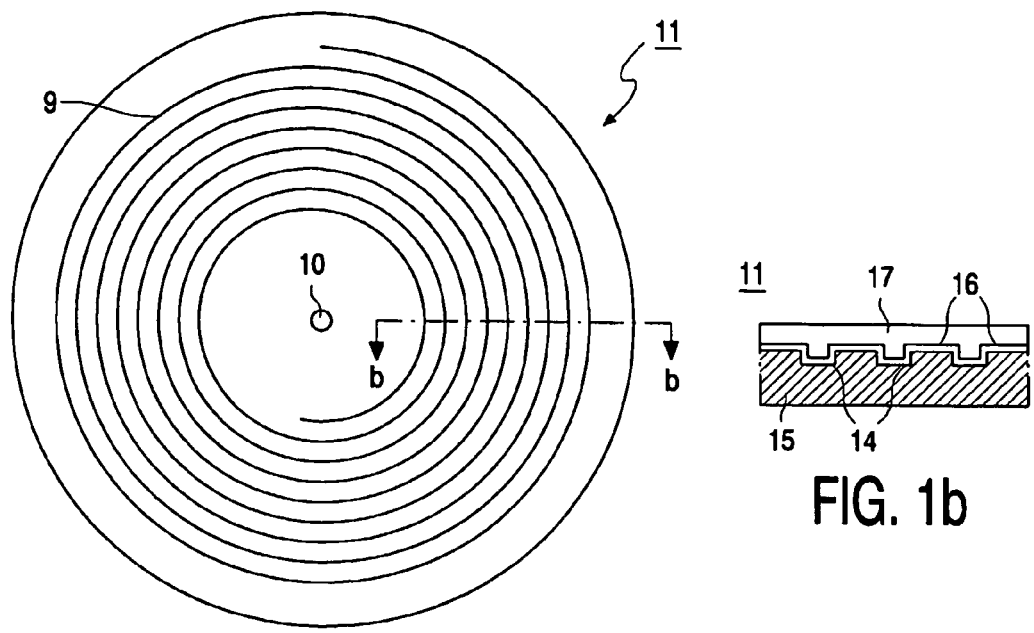
FIG. 1a
FIG. 1b
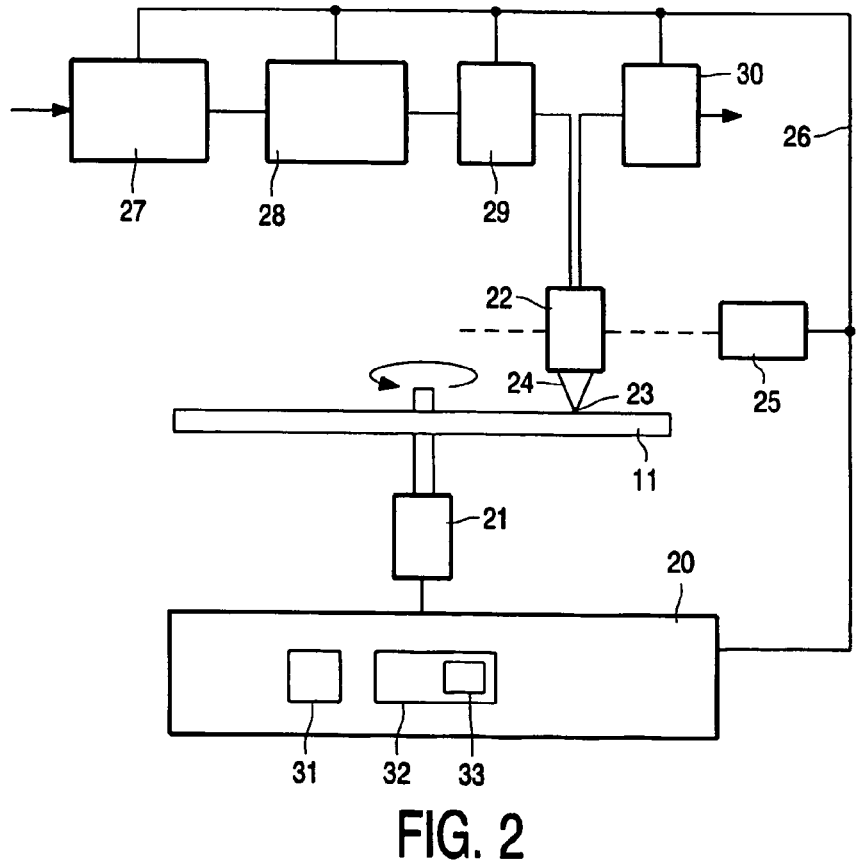
FIG. 2

DEVICE AND METHOD FOR RECORDING INFORMATION

The invention relates to a device for recording information in blocks having logical addresses, which device comprises recording means for recording marks in a track on a record carrier representing the information, and control means for controlling the recording by locating each block at a physical address in the track.

The invention further relates to a record carrier for storing information, the record carrier comprising information in blocks having logical addresses located at physical addresses in a track.

The invention further relates to a method of recording of information in blocks having logical addresses located at a physical address on a record carrier.

The invention further relates to a computer program product for recording of information.

The invention relates to the field of defect management in recording systems, and in particular to setting a record carrier to a read-only state.

A device and method for recording information on a record carrier are known from U.S. Pat. No. 5,956,309. The apparatus has recording means for recording the information in information blocks having logical addresses on an optical disc in a track at allocated physical addresses. The logical addresses constitute a contiguous storage space. In practice, the record carrier may exhibit defective parts of the track, in particular a defect preventing a block to be recorded at a specific physical address. These defects might be caused by product flaws, scratches, dust, fingerprints, etc. The physical addresses having defects are detected and defect management information is created and maintained. For example, initially before any user data is recorded, defects are detected, and physical addresses of defective sectors are removed from use by skipping the affected physical addresses based on a (primary) defect table, a process usually called slipping. In the event of defects detected during use of the record carrier, logical addresses assigned to defective physical addresses are assigned to different physical addresses in a defect management area via a (secondary) defect table, a process usually called remapping or linear replacement. In general the defect management area may be constituted by physically distributed sub-areas. In the tables defect entries indicate locations of physical addresses to be used for the replacement of defective physical addresses. The entries may be free for use or indicate a replacement.

Recording media like optical discs (DVD+RW, Blu-ray Disc, etc.) are capable of storing large amount of data of different types. They can be used in different environments having specific requirements as for organization of data on a recording medium. Typically, data are organized into files in accordance with rules of a particular file system. Such file system has its own file system data, which include information about all kind of structures relating to data stored on a recording medium. In particular, file system data may include volume structures representing the structures of logical and/or physical volumes, file structures representing the structures of files containing the data, directory structures describing grouping of files, and a space bitmap representing allocated or unallocated space for storing data on a recording medium. A recording medium may comprise addressable recording units for storing the data. At a level of a file system those units are referenced to with use of logical addresses defining addressing space. Partitioning of a recording medium allocates a space on the medium for storing data under control (according to rules) of a file system.

At present, for example, DVD+RW discs are in use by Consumer Electronics (CE) devices and in the Personal Computer (PC) environment. In the CE environment DVD+RW discs are used mainly for recording digital video information according to a format of DVD Video Recording, commonly referred to as DVD+VR. This means that there are defined specific allocation rules and set of files containing the video information itself and information about that video information such as title information, menu structures, etc. For example, in the DVD+VR format some files start at fixed addresses. Next to that the (predefined) list of files has to be physically on a medium in a certain order.

The PC environment is based on a different philosophy. There are, in principle, no allocation requirements. Specific applications may require some files to be present in a certain directory and applications will typically have their own data format to store information in files or to retrieve information from a file. This means that as long as there is free space available on a medium it is possible to add data files to that medium from all kinds of different applications. As an example, on a single disc there could be multi-media files, text files and executable files all mixed with each other.

Recently, more and more CE devices, like video players/recorders, have capability to seek through the file system information on the disc for files of a certain type that they can handle as well. Examples of this are (mainly) JPEG files and also, already more and more, MP3 files. In the future possibly more types of multi-media files will be supported in the CE world. Next to that, also new standards on meta-data are created (such as e.g. MPV or HighMAT) designed to make it easier to move digital content between PCs and home electronics devices, e.g. by providing a common "look and feel" in different environments.

The published international patent application WO 01/22416 A1 discloses the recording apparatus capable of performing initialization, formatting and defect management of a rewritable medium such as a CD-RW disc. This is done to facilitate the use of CD-RW as a high-capacity floppy disc, so immediate writing or reading of files is possible. Such media are commonly referred to as Mount Rainier ReWritable (MRW) media, e.g. CD-MRW, DVD+MRW. Furthermore, said recording apparatus makes it possible to store file system data of different file systems on one recording medium, so-called "bridge medium". This facilitates sharing of the bridge medium between different environments, e.g. the CE environment and the PC environment. A special part of a recording medium, called a general application area (GAA), is allocated for storing file system data of a file system used by other devices not capable of performing the defect management in line with WO 01/22416 A1. In the DVD+MRW media, GAA has a size of 2 MBytes.

In the PC environment the most likely way of adding data to the bridge medium is by means of "drag-and-drop" technique. A user can then make the medium compatible with legacy players through the use of a compliance (bridge) application running on the PC. Basically, the application writes a second ("limited") file system data, called "CE-bridge", to the medium, using the suitable file system(s) and content pointers, such that a legacy "non-MRW" system can interpret these as content under its main file system. As a result, the CE-player will play the content that is referenced by this file system data, for which it has suitable content decoders. When the bridge medium is used in a non-MRW PC-drive, the GAA file system is mounted by the host and "drag-and-drop" is not possible.

In general there is a need to protect a record carrier against modifying the contents, commonly referred to as a read-only state. The current MRW recording format does not provide a read-only mechanism.

It is an object of the invention to provide a system for setting a record carrier to a read-only state, which is also recognized by legacy devices according to a predefined recording format.

For this purpose in accordance with a first aspect of the invention, in the device for recording as defined in the opening paragraph, the control means comprise defect management means for translating the logical addresses into the physical addresses and vice versa in dependence of defect management information in a defect management area according to a predefined recording format, the defect management information including defect entries indicating locations for replacing defective physical addresses, a read-only state of the record carrier being obtainable via a no-replacement state indicated by substantially none of the defect entries being free for use, and read-only control means for setting the record carrier to the read-only state by reading original replacement information indicating a writable state from the defect management area, the original replacement information at least including at least one defect entry being free for use, storing the original replacement information in a hidden area, and modifying the defect management information to the no-replacement state.

For this purpose in accordance with a second aspect of the invention, the record carrier as defined in the opening paragraph comprises defect management information in a defect management area according to a predefined recording format, which defect management information provides a relation between the logical addresses and the physical addresses, and includes defect entries indicating locations for replacing defective physical addresses, a read-only state of the record carrier being effected via a no-replacement state indicated by substantially none of the defect entries being free for use, and original replacement information in a hidden location indicating a writable state of the defect management information, the original replacement information at least including at least one defect entry being free for use.

For this purpose in accordance with a third aspect of the invention, in the method of recording of information as defined in the opening paragraph, the logical addresses correspond to the physical addresses in dependence of defect management information in a defect management area according to a predefined recording format, which defect management information includes defect entries indicating locations for replacing defective physical addresses, a read-only state of the record carrier being obtainable via a no-replacement state indicated by substantially none of the defect entries being free for use, the method comprising setting the record carrier to the read-only state by reading original replacement information indicating a writable state from the defect management area, the original replacement information at least including at least one defect entry being free for use, storing the original replacement information in a hidden location, and modifying the defect management information to the no-replacement state.

The measures according to the invention have the effect that devices operating according to the pre-existing recording format, such as MRW, while reading a record carrier having the no-replacement state, must refrain from recording new data. This effectively brings the record carrier into the read-only state. This has the advantage that devices operating according to the new, extended recording format are aware of the original replacement information, and therefore are aware of the setting to the read-only state. Moreover, such devices may reset the record carrier from the read-only state to the original writable state by recovering the original replacement information.

In an embodiment of the device the read-only control means include re-open means for resetting the record carrier from the read-only state by retrieving the original replacement information from the hidden location, modifying the defect management information to the writable state in dependence of the original replacement information. This has the advantage that the record carrier is reset to the writable state having the defect management information equal to the state before setting the record carrier to the read-only state.

In an embodiment of the device the defect entries are arranged in defect tables, and the read-only control means are arranged for storing a copy of the defect tables as the original replacement information in the hidden location. This has the advantage that recovering the original writable state is performed by reading the copy and writing the data to the defect management area according to a predefined recording format.

In an embodiment of the device the defect management information comprises a main information packet having pointers to the defect tables, and the read-only control means are arranged for generating a secondary information packet having pointers to the copy of the defect tables in the hidden location. This has the advantage that a same reading mechanism is applicable for reading the original defect tables and for reading the copy.

In an embodiment of the device the read-only control means are arranged for storing the original replacement information in the hidden location having a predefined position related to the defect management information, in particular related to a position of the defect entries in the defect management area. This has the advantage that the hidden location can be easily found via the location of the defect management information Further embodiments are given in the dependent claims.

Figure 3B:
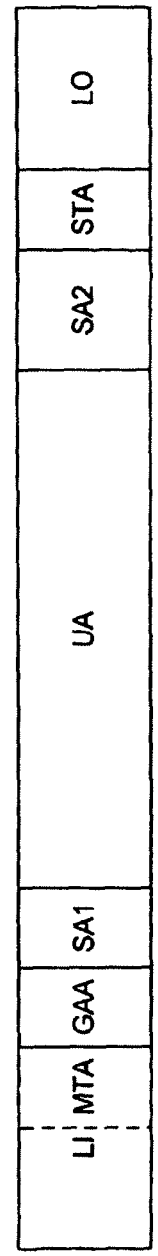
Figure 4:
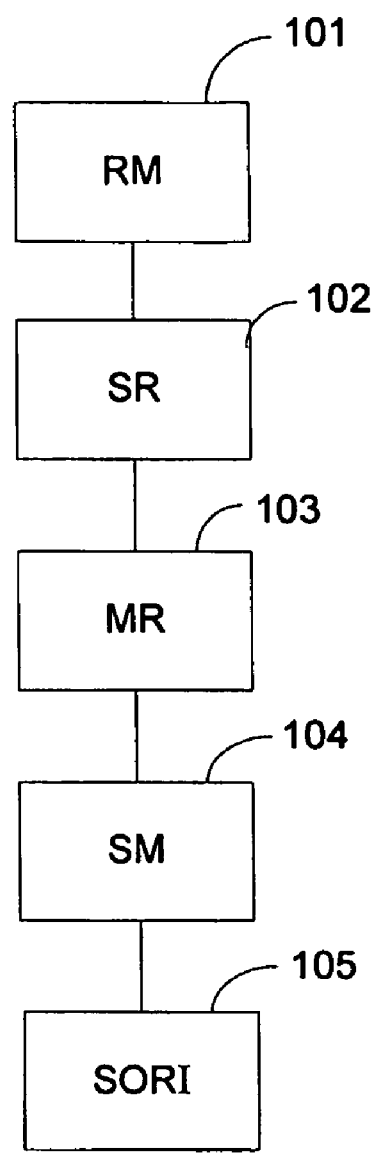
Figure 5:
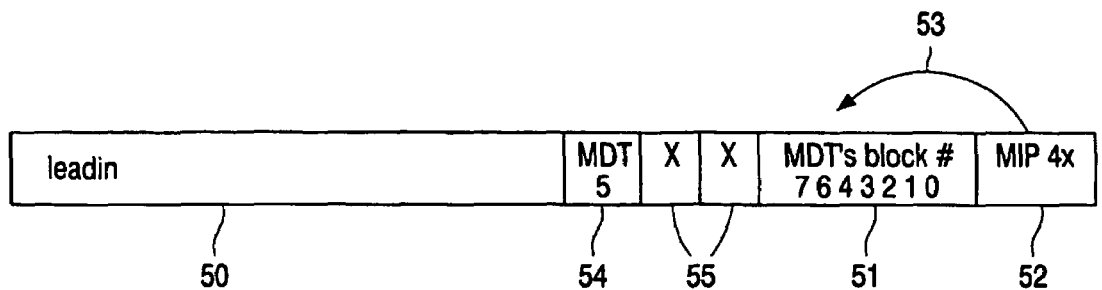
Figure 6:
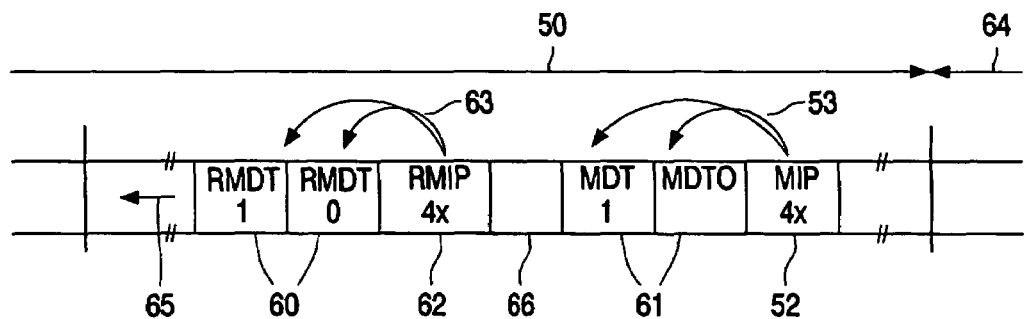
Figure 7:
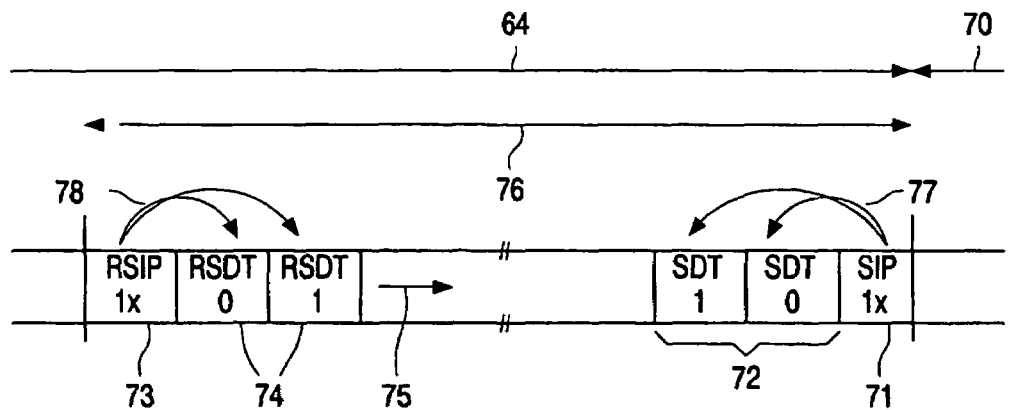

These and other aspects of the invention will be apparent from and elucidated further with reference to the embodiments described by way of example in the following description and with reference to the accompanying drawings, in which FIG. 1a shows a record carrier (top view), FIG. 1b shows a record carrier (cross section), FIG. 2 shows a recording apparatus (in accordance with the invention), FIG. 3a shows a simplified layout of a non-MRW type of medium (prior art), FIG. 3b shows a simplified layout of a MRW type of medium (prior art), FIG. 4 shows an example of a method of blocking write access to the user area using a list of replacement areas (in accordance with the invention), FIG. 5 shows a disc layout with the table structures of a MRW formatted disc, FIG. 6 shows a disc layout with the table structures of a MRW formatted disc and hidden locations for original replacement information, and FIG. 7 shows a secondary defect management area and original replacement information.

Corresponding elements in different Figures have identical reference numerals.

FIG. 1a shows an example of a recording medium 11 having a form of disc with a track 9 and a central hole 10. The track 9, being the position of the series of (to be) recorded marks representing digital information signals (data), is arranged in accordance with a spiral pattern of turns constituting substantially parallel tracks on an information layer. The recording medium may be optically readable, called an optical disc, and has an information layer of a recordable type. Examples of a recordable disc are the CD-RW, and writable versions of DVD, such as DVD+RW, and the high density writable optical disc using blue lasers, called Blu-ray Disc (BD).

Digital information signals (data) are represented on the information layer by recording optically detectable marks along the track, e.g. crystalline or amorphous marks in phase change material. The track 9 on the recordable type of recording medium is indicated by a pre-embossed track structure provided during manufacture of the blank recording medium.

FIG. 1b is a cross-section taken along the line b-b of the recording medium 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. The track structure is constituted, for example, by a pregroove 14, which enables a read/write head to follow the track during scanning. The track structure comprises position information, e.g. addresses, for indication the location of units of information, usually called information blocks or packets. The pregroove 14 may be implemented as an indentation or an elevation of the substrate 15 material, or as a material property deviating from its surroundings.

FIG. 2 shows a recording apparatus for recording digital information signals on a recording medium 11 such as CD-RW, DVD+RW or BD, in accordance with the invention. The apparatus is provided with recording means for scanning the track on the recording medium, which means include a drive unit 21 for rotating the recording medium 11, a head 22, and a positioning unit 25 for coarsely positioning the head 22 in the radial direction on the track. The head 22 comprises an optical system of a known type for generating a radiation beam 24 guided through optical elements focused to a radiation spot 23 on a track of the information layer of the recording medium. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. For writing digital information signals (data) the radiation is controlled to create optically detectable marks in the recording layer. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material. For reading, the radiation reflected by the information layer is detected by a detector of a usual type, e.g. a four-quadrant diode, in the head 22 for generating a read signal and further detector signals including a tracking error and a focusing error signal for controlling said tracking and focusing actuators. The read signal is processed by read processing unit 30 of a usual type including a demodulator, deformatter and output unit to retrieve the digital information signals (data). Hence retrieving means for reading information include the drive unit 21, the head 22, the positioning unit 25 and the read processing unit 30. The apparatus comprises write processing means for processing the input digital information signals (data) to generate a write signal to drive the head 22, which means comprise an input unit 27, and modulator means comprising a formatter 28 and a modulator 29. The input digital information signals (data) may comprise for example real-time video and/or audio data or still images data. The input unit 27 processes the input data to units of information, which are passed to the formatter 28 for adding control data and formatting the data, e.g. by adding error correction codes (ECC) and/or interleaving. For computer applications units of information may be interfaced to the formatter 28 directly—in such case, as an option, the input unit 27 does not have to be present in the apparatus. The formatted data from the output of the formatter 28 is passed to the modulation unit 29, which comprises for example a channel coder, for generating a modulated signal, which drives the head 22. Further the modulation unit 29 comprises synchronizing means for including synchronizing patterns in the modulated signal. The formatted units presented to the input of the modulation unit 29 comprise address information and are written to corresponding addressable locations on the recording medium under the control of control unit 20. Further, the apparatus comprises a control unit 20, which controls the recording and retrieving of information and may be arranged for receiving commands from a user or from a host computer. The control unit 20 is connected via control lines 26, e.g. a system bus, to said input unit 27, formatter 28 and modulator 29, to the read processing unit 30, and to the drive unit 21, and the positioning unit 25. The control unit 20 comprises control circuitry, for example a microprocessor, a program memory and control gates, for performing the procedures and functions according to the invention as described below. The control unit 20 may also be implemented as a state machine in logic circuits.

The control unit 20 is arranged for controlling the recording by locating each block at a physical address in the track, and for performing defect management as described below. The control unit includes the following cooperating units: a defect management unit 31, a read-only control unit 32, which (optionally) comprises a re-open unit 33, which units are for example implemented in firmware.

The defect management unit 31 is for translating physical addresses into logical addresses and vice versa in dependence of defect management information. The logical addresses constitute a contiguous storage space to be used for storing sequences of information blocks, such as data under control of a file management system, for example UDF. The defect management unit 31 detects defects, for example by monitoring the signal quality of a read-out signal from the head 22 during recording and/or reading. The defects may also be detected by determining an error rate in retrieved information blocks. The defect management unit further maintains, according to the predefined recording format, the defect management information in a defect management area (which may be constituted by physically separated sub-areas, for example as in CD-MRW) on the record carrier, for example primary defect lists indicating slipped defects and secondary defect lists indicating remapped locations. The defect management information at least includes defect entries for indicating a replacement of one or more defective physical addresses by alternative addresses. The defect management information includes information about which defect entries are still free for use, for example by the defect entries having a default value, or a separate bitmap.

FIG. 3a shows a simplified layout of a non-MRW type of medium. Schematically a recording area is shown having a lead-in area (LI), a area (UA) and a lead-out (LO).

FIG. 3b shows a simplified layout of a MRW type of medium. Similar to FIG. 3a the recording area comprises lead-in area LI, a user area UA, and lead-out area LO. In addition thereto it comprises a general application area GAA, a spare area SA (in this example comprising two sub-areas SA1 and SA2), and a main table area MTA and a secondary table area STA. LI and LO contain mainly media read/write definition and administration data. The user area UA is used mainly for recording of data used for real use and data related to content stored on a recording medium, such as user data and first file system data comprising directory and file entries pointing to the user data according to rules of a first file system. The general application area GAA can be used for storage of data that does not allow replacements by the defect management, such as application programs or device drivers that can handle defects, or file system data of additional file systems.

The control unit 20 is capable of performing initialization and formatting of a rewritable medium according to a pre-defined recording format, for example a DVD+RW format. In the recording format shown in FIG. 3b the defect management is based on a main defect table MDT stored in the main table area MTA, a secondary defect table SDT stored in the secondary table area STA and replacement areas (packets) comprised in the spare area SA1, SA2. The secondary defect table is a copy of the main defect table; SDT contains the same information as MDT. It only needs to be updated when the medium is ejected from a recorder. STA is used as redundancy in case of issues with MTA, and for assuring that non-MRW PC-systems can use these tables for address remapper in order to logically construct the address space, compensating for the defect management reallocation (not interpretable by non-MRW drives). The main table area MTA is located within the lead-in area LI. Recording media with a layout of the type shown in FIG. 3b are commonly referred to as Mount Rainier ReWritable (MRW) media, e.g. DVD+MRW, in contrast to "non-MRW" media with a layout as in example shown in FIG. 3a. In case of DVD+MRW recording media, GAA, SA1 and SA2 have a size of 2, 8 and 120 (or 504) MBytes, respectively.

Based on the MRW definitions, it is possible to ensure that MRW media can be read by non-MRW capable drives, by installing a remapping driver on the PC. This remapping driver can be obtained easily, amongst other, by using GAA, such that the file system in GAA launches an application, which installs this driver or downloads it from the Internet. For convergence with non-MRW aware CE devices, the same or a different file system, (typically ISO9660 or UDF) can be used for allowing addressing of the content typically recognized by CE devices. This is done by pointing to the multimedia content stored in UA of the MRW medium, using file system data stored in GAA, hereinafter also referred to as second file system data, known by CE devices. There can be an extra file system in GAA, dedicated to performing tasks related to the remapping driver.

The defect management employs predefined rules for determining defective areas in UA, for organizing spare areas on a medium, for defining circumstances under which data can be recorded/modified on the medium, generally, for controlling storing information on the medium. A defect table contains information, which can be used to perform the defect management. In particular, the defect table contains a list of defective areas (packets), which have been determined to be defective during verification or during use of the medium, according to rules of the defect management. Further, it contains a list of replacement areas (packets), to be used as replacements of defective areas. The format of defect management data in the defect table is defined in the defect management rules. Defective and replacement areas are referred to by their addresses on the medium. Different flags or status bits within the defect table indicate characteristics of those areas, e.g. usability for data recording. The defect table also contains information related to areas on the medium, where the defect management shall not be active, for example a size or position of GAA.

The control unit 20 is adapted to read the defect table from the medium, to modify defect management data comprised in the defect table read in order to block write access to UA according to the defect management rules and to record the defect table comprising modified defect management data back on the medium.

In an embodiment, the control unit 20 is capable of setting all free replacement entries in the MRW defect table to unusable, making the medium read-only because the medium has run out of spare area and the defect management requires MRW drives to disable writing capabilities to such discs.

FIG. 4 shows an example of a method of blocking write access to the user area using a list of replacement areas. The particular method is performed by the read-only unit 32 in the control unit 20 of an embodiment of the apparatus. In step READ MAIN (RM) 101, MDT is read from a disc. In step SEARCH (SR) 102, a list of addresses of replacement areas is searched for free replacement area addresses of all free replacement areas which are not used for replacing user data. Next, in step MARK (MR) 103, the free replacement areas are marked as unusable in MDT. Finally, MDT is recorded back on the disc in step STORE MAIN (SM) 104. Finally, in step STORE ORIGINAL REPLACEMENT INFO (SORI) 105 original replacement data for recovering the original contents of the MDT is stored in a new location, called a hidden location because devices according to the pre-existing version of the recording format are not aware of the new location.

In an embodiment (illustrated further with reference to FIG. 5) MDT is recorded in MTA as a Main Information Packet (MIP) and at least two Main Defect Table Packets (MDTP0 and MDTP1). In such case, SDT comprise a Secondary Information Packet (SIP) and Secondary Defect Table Packets (SDTP0 and SDTP1) corresponding to MIP, MDTP0 and MDTP1, respectively. All packets of SDT have the same contents as the corresponding packets of MDT. MIP and SIP contain the basic information about the defect management structures on the medium, such as number and locations of Main/Secondary Defect Tables Packets, and sizes of GAA, SA1 and SA2. A list of defect areas, which have been determined to be defective during verification or during use of the medium, and a list of replacement areas reserved for replacements are comprised in MDTP0 and MDTP1.

In an embodiment, the control unit 20 is adapted to modify data comprised in MDT to set all free replacement entries in MDTP0 and SDT to unusable. This will provide a strong protection against writing on the medium as the recovered information in MDT will indicate that the medium has run out of spare area.

In an embodiment, if during the reading of the disc which has been set to the read-only state, new defects arise in the UA, the defect may be corrected. In this event the MDT and SDT tables have to be updated correctly in order to remain DVD+MRW playback compatible. That means that an 'unusable' status has to be changed into a valid replacement.

In an embodiment of the apparatus, the control unit 20 is adapted to generate protection data comprising so called original replacement information related to modification of defect management data in MDT or SDT and to record this information on a medium, as shown in step SORI 105 in FIG.

4. For example, the protection information may further comprise an auto-run application stored in GAA, which, when launched on non-MRW legacy systems, warns a user that the medium contains content suitable for CE playback and should not be written without use of a special application and/or an upgraded device. Using the same or another auto-run application a user can be notified that this is a special disc, needing a special application and/or drives to enable writing to the disc, in such a way that CE bridge is kept consistent with the content changes, in case of MRW capable systems without the bridge functionality.

In an embodiment the protection information comprises information describing changes made to defect management data stored on a disc in order to block write access to UA. In an embodiment, the control unit 20 is adapted to resume write access to UA by restoring original defect management data using the protection information, in particular the original replacement information. This can be done e.g. by a special command requesting the apparatus to restore write access to this disc by recovering invalidated spares, replacement areas. The control unit 20 is also capable of restoring consistency of data between MDT and SDT, e.g. by rewriting a reconstructed version of the MDT in the STA as explained with FIG. 7. In addition the control unit 20 may be capable of suppressing the above described auto-run applications or "hiding" this part of file system to the operating system. For updating the bridge information, after the write updates to the disc, the control unit 20 can bring the disc back to the same "read-only" state, as the disc came into the apparatus, but now reflecting the updated CE bridge in GAA.

As explained above a Mount Rainier disc can be made read-only by switching all the free defect entries to unusable or in use as replacement. This method is used to prevent that "legacy" or standard Mount Rainier drives write to the disc. Drives according to the invention are aware that the disc is made read-only. For resetting the record carrier to a writable state, there is a need to know the original content of the defect tables. Some solutions are presented below.

FIG. 5 shows a disc layout with the table structures of a MRW formatted disc. MDT blocks 51 are stored in a defect management area in a lead-in 50. The area has 2 bad blocks 55 which cannot be used to store MDT tables. Hence a further MDT block 54 is stored before the bad blocks 55. A main information packet MIP 52 has pointers 53 to the MDT blocks. It is noted that the number of MDT blocks (#0 to #7) constitutes a relatively large amount of MDT blocks. The defect tables may be repeatedly stored to provide robustness against defects in the defect management area.

To make the disc read-only all entries not yet used to indicate valid replacements are set to the status 'unusable' in the MDT tables. The modified MDT tables are stored on the same location as the original tables. A MRW drive that mounts the disc detects that there are no free replacement anymore and does not grant write access to this disc.

A solution for resetting the record carrier to the writable state, also called re-open, is that the defect information, in particular the original replacement information from the tables indicating the original defect entries free for replacements, is stored on a different location, which is known by the new device. The legacy system still sees the standard "full" tables.

For storing the original replacement information a new table structure may be defined. For example only information relating to the defect entries that have been modified is stored as original replacement information. For restoring there only needs to be an indication which entries have to be restored to "free for use". Hence a bitmap or list of entries may be stored. From the bitmap and the modified defect management information the original defect management tables can be reconstructed.

In an embodiment a hidden location at a fixed position somewhere in the lead-in (or lead-out) is reserved for the original defect information. Another solution is to store the original tables as a file, for example in the GAA area. A practical solution described hereafter makes use of already existing firmware that is capable of reading the MRW structure.

FIG. 6 shows a disc layout with the table structures of a MRW formatted disc and hidden locations for original replacement information. The lead-in 50 is followed by a user data area 64. The replacement information in the original MDT blocks (MDT0, MDT1) has been modified so that all defect entries indicate to be in use (e.g. in use for replacement or unusable). The modified MDT blocks 61 have been written to the defect management area according to the MRW recording format. The original Main Information Packet (MIP) 52 has a pointer that points to the last used ECC block in the lead-in for the MRW tables, in this example that is block 66. Hence a suitable hidden location is just before the last used ECC block. Hence this hidden location has a predefined relation to the location of the original defect entries in the MDT blocks indicated by the MIP 52.

On the first block of the hidden location a real main information packet (RMIP) 62 is written. The RMIP is the information packet that contains pointers 63 that point to the original replacement information 60, e.g. (real) defect tables RMDT0, RMDT1. The RMIP and its pointers are used by the new device to find the real defect entries. In a practical embodiment the structure of the RMIP is exactly the same as the one used for the already defined MIP. The RMIP may be repeated (e.g. 4× times) to protect against dirt and scratches.

An advantage of the proposed hidden location is that the new device can easily and quickly check on the existence of the RMIP, to check if the disc is formatted for that purpose. The drive reads the MIP, then accesses the first written ECC block minus 1 and checks on a RMIP signature, i.e. a predefined part having a known value in the RMIP. The signature may be equal to the signature of the MIP. From that point on the drive can access the disc in the standard MRW way of working, either reading the standard MDTs or the second set of RDTs.

As indicated by arrow 65 the hidden location grows by storing real tables in the lead-in. The hidden location will grow from outer to inner side. If the disc is reformatted with a "legacy" Mount Rainier drive, the structures will be overwritten (in time).

It is noted that the Mount Rainier recording format also has duplicate tables (usually called outer tables) on the outside near the lead-out as shown in FIG. 3b for ROM compatibility and also as backup for the tables on the inside.

FIG. 7 shows a secondary defect management area and original replacement information. According to the MRW format (see also FIG. 3b), secondary defect tables SDT 72, a secondary information packet SIP 71 having pointers 77 to the SDT 72 are stored in a secondary table area STA 76 at the end of the user data area 64 near the lead-out 70. The SIP and SDT are backup copies of the MIP and MDT in the lead-in. It is noted that for setting the read-only state the backup copy SDT 72 is preferably also modified corresponding to the MDT 61 in the lead-in to reflect the no-replacement state.

In an embodiment of the invention a real secondary information packet 73 (RSIP) and original replacement information 74 (RSDT, Real Secondary Defect Tables) are stored on the outside in the STA for safety and robustness reasons. The Real Secondary Information Packet (RSIP) 73 has a fixed place in the STA just as the MIP has in the STA. The hidden location from the RDT blocks grows from inner to outer direction as indicated by arrow 75.

In an embodiment, the recording apparatus is arranged as a drive unit to be connected to a separate host system, for example a drive unit to be build in a PC. The control unit 20 is arranged to communicate with a processing unit in the host system via a standardized interface.

In an embodiment of a computer data system comprising the host system and the recording apparatus, the processing unit in the host system is adapted to control the control unit 20 to perform methods and functions as described in reference to embodiments of the recording apparatus presented above. Alternatively the host system may be provided with software (e.g. distributed via a computer program product such as a CD) for performing the above read-only functions using a standard drive unit, which is not aware of the new data structure and the hidden locations. Hence a computer program product according to the invention is operative to cause the control unit 20, or the processing unit in the host system, to perform methods and functions as described in reference to embodiments of the recording apparatus presented above.

Although the invention has been explained mainly by embodiments using the DVD+MRW, similar embodiments like CD or BD having defect management can apply the invention. Also for the information carrier an optical disc has been described, but other media such as a magnetic hard disc can be used. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

The invention claimed is:

1. A device for recording information in blocks having logical addresses, wherein the device comprises
   recording means for recording marks in a track on a record carrier representing the information, and
   control means for controlling the recording by locating each block at a physical address in the track, the control means comprising
   defect management means for translating the logical addresses into the physical addresses and vice versa in dependence of defect management information in a defect management area according to a predefined recording format,
   the defect management information including defect entries indicating locations for replacing defective physical addresses, a read-only state of the record carrier being obtainable via a no-replacement state indicated by substantially none of the defect entries being free for use, and
   read-only control means for setting the record carrier to the read-only state by:
   reading original replacement information indicating a writable state from the defect management area, the original replacement information at least including at least one defect entry being free for use,
   storing the original replacement information in a hidden area, and
   modifying the defect management information to the no-replacement state;
   wherein the read-only control means include re-open means for resetting the record carrier from the read-only state to the writable state by:
   retrieving the original replacement information from the hidden location,
   modifying the defect management information to the writable state in dependence of the original replacement information.

2. The device as claimed in claim 1, wherein the defect entries are arranged in defect tables, and the read-only control means are arranged for storing a copy of the defect tables as the original replacement information in the hidden location.

3. The device as claimed in claim 1, wherein the defect management information comprises a main information packet having pointers to the defect tables, and the read-only control means are arranged for generating a secondary information packet having pointers to the copy of the defect tables in the hidden location.

4. The device as claimed in claim 1, wherein the read-only control means are arranged for storing the original replacement information in the hidden location having a predefined position related to the defect management information including a position of the defect entries in the defect management area.

5. The device as claimed in claim 1, wherein the read-only control means are arranged for storing the original replacement information in a file as the hidden location.

6. A record carrier for storing information, the record carrier comprising:
   information in blocks having logical addresses located at physical addresses in a track,
   defect management information in a defect management area according to a predefined recording format, which defect management information provides a relation between the logical addresses and the physical addresses, and includes defect entries indicating locations for replacing defective physical addresses, a read-only state of the record carrier being effected via a no-replacement state indicated by substantially none of the defect entries being free for use, and
   original replacement information in a hidden location indicating a writable state of the defect management information, the original replacement information at least including at least one defect entry being free for use,
   wherein the record carrier being resettable from the read-only state to the writable state by retrieving the original replacement information from the hidden location, and modifying the defect management information to the writable state in dependence of the original replacement information.

7. A method of recording of information in blocks having logical addresses located at a physical address on a record carrier,
   the logical addresses corresponding to the physical addresses in dependence of defect management information in a defect management area according to a predefined recording format, wherein the defect management information includes defect entries indicating locations for replacing defective physical addresses,
   a read-only state of the record carrier being obtainable via a no-replacement state indicated by substantially none of the defect entries being free for use, the method comprising the acts of:

setting the record carrier to the read-only state by:

reading original replacement information indicating a writable state from the defect management area, the original replacement information at least including at least one defect entry being free for use, storing the original replacement information in a hidden location, and modifying the defect management information to the no-replacement state; and resetting the record carrier from the read-only state to the writable state by:

retrieving the original replacement information from the hidden location, modifying the defect management information to the writable state in dependence of the original replacement information.

8. A computer readable storage medium embodying a computer program product for recording of information, which program is operative to cause a processor to perform the method as claimed in claim 7.

9. The device of claim 1, wherein the control means generates a warning to a user that the record carrier should not be written without use of a special application.

10. The device of claim 1, wherein the control means generates a warning to a user that the record carrier is a special record carrier, needing a special application to enable writing to the record carrier.

11. The record carrier of claim 6, further comprising warning information to warn a user that the record carrier should not be written without use of a special application.

12. The record carrier of claim 6, further comprising warning information to warn a user that the record carrier is a special record carrier, needing a special application to enable writing to the record carrier.

13. The method of claim 7, further comprising the act of warning a user that the record carrier is a special record carrier, needing a special application to enable writing to the record carrier.

14. The method of claim 7, further comprising the act of warning a user that the record carrier is a special record carrier, needing a special application to enable writing to the record carrier.

* * * * *